US009565672B2

(12) United States Patent
Oyman

(10) Patent No.: US 9,565,672 B2
(45) Date of Patent: *Feb. 7, 2017

(54) TECHNIQUES FOR IMPROVED MULTICAST CONTENT DELIVERY

(71) Applicant: Intel Corporation, Santa Clara, CA (US)

(72) Inventor: Ozgur Oyman, Palo Alto, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/605,742

(22) Filed: Jan. 26, 2015

(65) Prior Publication Data

US 2015/0134787 A1 May 14, 2015

Related U.S. Application Data

(63) Continuation of application No. 13/553,880, filed on Jul. 20, 2012, now abandoned.

(Continued)

(51) Int. Cl.
*H04W 72/04* (2009.01)
*H04L 27/26* (2006.01)
(Continued)

(52) U.S. Cl.
CPC .......... *H04W 72/044* (2013.01); *H04B 1/69* (2013.01); *H04B 7/024* (2013.01); *H04B 7/0413* (2013.01);
(Continued)

(58) Field of Classification Search
CPC .................. H04H 20/07; H04L 12/28
See application file for complete search history.

(56) References Cited

U.S. PATENT DOCUMENTS 7,886,201 B2* 2/2011 Shi ................... H03M 13/2966
714/52
8,087,052 B2* 12/2011 Lee ....................... H04N 7/015
370/312

(Continued)

FOREIGN PATENT DOCUMENTS

EP 2453652 5/2012
WO 2011003231 1/2011

OTHER PUBLICATIONS

TS 26-247 teach Progressive Download and Dynamic Adaptive Streaming over HTTP (3GP-DASH). This specification is part of Packet-switched Streaming Service (PSS). HTTP-based progressive download and dynamic adaptive streaming are separated from TS 26.234 to differentiate from RTP-based streaming that is maintained in TS 26.234.*

(Continued)

*Primary Examiner* — Andrew Lai
*Assistant Examiner* — Hoyet H Andrews

(57) ABSTRACT

Techniques for improved multicast content delivery are described. In some embodiments, for example, an apparatus includes a processor circuit, a communication component operative by the processor circuit to receive a data transmission containing a description segment and a correspondence segment, a correspondence processing component operative by the processor circuit to determine a plurality of multicast content streams representing different versions of a media content based on the correspondence segment, and a selection component operative by the processor circuit to select and receive one or more of the plurality of multicast content streams based on characteristics identified in the description segment. In various such embodiments, the apparatus includes an adaptation component operative by the processor circuit to adaptively switch across the plurality of multicast content streams for reception and processing (Continued)

based on characteristics identified in the description segment. Other embodiments are described and claimed.

25 Claims, 9 Drawing Sheets

Related U.S. Application Data

(60) Provisional application No. 61/591,641, filed on Jan. 27, 2012.

(51) Int. Cl.

| | | |
|---|---|---|
| H04L 5/00 | (2006.01) | |
| H04B 1/69 | (2011.01) | |
| H04W 72/08 | (2009.01) | |
| H04B 7/02 | (2006.01) | |
| H04B 7/06 | (2006.01) | |
| H04W 4/08 | (2009.01) | |
| H04W 4/00 | (2009.01) | |
| H04L 12/18 | (2006.01) | |
| H04L 29/06 | (2006.01) | |
| H04B 7/04 | (2006.01) | |
| H04L 1/18 | (2006.01) | |
| H04L 5/14 | (2006.01) | |
| H04W 52/02 | (2009.01) | |
| H04W 36/00 | (2009.01) | |
| H04L 1/00 | (2006.01) | |
| H04W 76/04 | (2009.01) | |
| H04W 36/04 | (2009.01) | |

(52) U.S. Cl.
CPC .......... *H04B 7/0456* (2013.01); *H04B 7/0617* (2013.01); *H04B 7/0639* (2013.01); *H04L 1/0026* (2013.01); *H04L 1/1864* (2013.01); *H04L 1/1896* (2013.01); *H04L 5/0035* (2013.01); *H04L 5/0048* (2013.01); *H04L 5/1469* (2013.01); *H04L 12/189* (2013.01); *H04L 27/2607* (2013.01); *H04L 65/4076* (2013.01); *H04L 65/608* (2013.01); *H04W 4/005* (2013.01); *H04W 4/08* (2013.01); *H04W 36/0094* (2013.01); *H04W 52/0216* (2013.01); *H04W 72/04* (2013.01); *H04W 72/042* (2013.01); *H04W 72/0406* (2013.01); *H04W 72/0493* (2013.01); *H04W 72/082* (2013.01); *H04W 72/085* (2013.01); *H04W 76/048* (2013.01); *H04L 1/0027* (2013.01); *H04L 1/0031* (2013.01); *H04L 1/1887* (2013.01); *H04L 5/0053* (2013.01); *H04W 36/04* (2013.01); *Y02B 60/50* (2013.01)

(56) References Cited

U.S. PATENT DOCUMENTS

| | | | | |
|---|---|---|---|---|
| 8,141,119 B2* | 3/2012 | Song | ................ | H04N 21/41407 370/312 |
| 8,149,755 B2* | 4/2012 | Song | ...................... | H04H 40/27 370/312 |
| 8,199,830 B2* | 6/2012 | Lee | ....................... | H04L 1/0065 370/312 |
| 8,229,346 B2* | 7/2012 | Zisimopoulos | ..... | H04W 72/005 455/3.02 |
| 8,387,097 B2* | 2/2013 | Shin | ...................... | H04H 40/18 370/329 |
| 8,437,347 B2* | 5/2013 | Casaccia | ................ | H04N 19/30 348/401.1 |
| 8,509,051 B2* | 8/2013 | Ling | ..................... | H04L 5/0007 370/203 |
| 8,510,781 B2* | 8/2013 | Kim | ....................... | H04H 60/14 370/329 |
| 8,515,336 B2* | 8/2013 | Collins | .............. | G06Q 30/0251 455/3.01 |
| 8,533,762 B2* | 9/2013 | Lee | ........................ | H04N 7/015 455/3.01 |
| 2005/0058089 A1* | 3/2005 | Vijayan | .................... | H04B 7/12 370/312 |
| 2005/0141475 A1* | 6/2005 | Vijayan | .................... | H04W 4/06 370/345 |
| 2006/0128331 A1* | 6/2006 | Rooyen | ................. | H04H 40/18 455/188.2 |
| 2006/0128424 A1* | 6/2006 | Rooyen | ................. | H04H 20/72 455/552.1 |
| 2007/0033494 A1* | 2/2007 | Wenger | ................ | H04N 19/147 714/776 |
| 2007/0165551 A1* | 7/2007 | Proctor | ................... | H04L 29/06 370/312 |
| 2008/0186935 A1* | 8/2008 | Ling | ..................... | H04L 5/0007 370/342 |
| 2008/0287127 A1* | 11/2008 | Wu | ..................... | H04W 72/1231 455/434 |
| 2009/0074051 A1* | 3/2009 | Manapragada | ....... | H04L 65/607 375/240 |
| 2009/0175210 A1* | 7/2009 | Vijayan | ................. | H04L 1/0065 370/312 |
| 2009/0191858 A1* | 7/2009 | Calisti | ................. | H04L 12/5695 455/422.1 |
| 2010/0034135 A1* | 2/2010 | Kim | ..................... | H04B 7/2606 370/315 |
| 2010/0034140 A1* | 2/2010 | Song | ..................... | H04N 21/235 370/328 |
| 2010/0203886 A1* | 8/2010 | Nobukiyo | ........... | H04W 72/005 455/434 |
| 2010/0265865 A9* | 10/2010 | Vijayan | .................... | H04B 7/12 370/312 |
| 2012/0128061 A1* | 5/2012 | Labrozzi | .......... | H04N 21/23435 375/240.02 |
| 2012/0231770 A1* | 9/2012 | Clarke | ................ | H04L 12/5885 455/414.1 |
| 2012/0300694 A1* | 11/2012 | Watanabe | .............. | H04W 16/32 370/315 |
| 2013/0223383 A1* | 8/2013 | Park | ........................ | H04H 20/57 370/329 |
| 2013/0294326 A1* | 11/2013 | Jiao | ..................... | H04W 76/022 370/312 |
| 2013/0318213 A1* | 11/2013 | Paila | ................. | H04L 29/06027 709/219 |
| 2014/0044094 A1* | 2/2014 | Vijayan | .................... | H04B 7/12 370/330 |
| 2014/0089990 A1* | 3/2014 | van Deventer | ...... | H04N 21/218 725/61 |
| 2014/0177483 A1* | 6/2014 | Jones | ........................ | H04L 5/14 370/278 |
| 2015/0098349 A1* | 4/2015 | Wei | ........................ | H04W 16/14 370/252 |
| 2015/0245375 A1* | 8/2015 | Li | ...................... | H04W 72/1263 370/329 |

OTHER PUBLICATIONS

Santhanaraj Muthusamy, titled "Teleca White Papers Solution area: e-MBMS in LTE Increasing broadcast and multicast service capacity and quality using LTE and MBMS"; published Jun. 30, 2011; (Muthusamy hereinafter).*

Sodagar, titled "The MPEG-DASH Standard for Multimedia Streaming Over the Internet"; Published by the IEEE Computer Society, Technical Specification, Sodagar, I., "The MPEG-DASH Standard for Multimedia Streaming Over the Internet," MultiMedia, IEEE , vol. 18, No. 4, pp. 62,67, Apr. 2011; doi: 10.1109/MMUL/2011.71.*

3GPP TS 26-346, titled "Technical Specification Group Services and System Aspects; Multimedia Broadcast/Multicast Service (MBMS); Protocols and codecs"; (Release 9); V9.4.0,; Technical Specification, pp. 01-150, dated Sep. 2010.*

(56) References Cited

OTHER PUBLICATIONS

TS 26-247—Progressive Download and Dynamic Adaptive Streaming over HTTP (3GP-DASH).*
3GPP TS 26-346, titled "Technical Specification Group Services and System Aspects; Multimedia Broadcast/Multicast Service (MBMS); Protocols and codecs"; (Release 9); V9.4.0,; Technical Specification, pp. 01-150, dated Sep. 2010; (TS 26-346 hereinafter).*
Santhanaraj Muthusamy, titled "Teleca White Papers Solution area: e-MBMS in LTE Increasing broadcast and multicast service capacity and quality using LTE and MBMS"; published Jun. 30, 2011.*
Sodagar, titled "The MPEG-DASH Standard for Multimedia Streaming Over the Internet"; Published by the IEEE Computer Society, Technical Specification, Sodagar, I., "The MPEG-Dash Standard for Multimedia Streaming Over the Internet," MultiMedia, IEEE , vol. 18, No. 4, pp. 62,67, Apr. 2011; doi: 10.1109/MMUL.2011.71.*
TS 26-247 titled Progressive Download and Dynamic Adaptive Streaming over HTTP (3GP-DASH), Technical Specification Group Services and System Aspects; Transparent end-to-end Packet-switched Streaming Service (PSS); Progressive Download and Dynamic Adaptive Streaming over HTTP (3GP-DASH) (Release 10).*
TS-26-247; 3GPP, TS 26247 V10.1.0 (Nov. 2011) Progressive Download and Dynamic Adaptive Streaming over HTTP (3GP-DASH), 113 pages, (author unknown).
Sodagar, Iraj, "The MPEG-DASH Standard for Multimedia Streaming Over the Internet" Multimedia, IEEE, vol. 18, No. 4, Apr. 2011, 6 pages.
Knappmeyer, et al., "Advanced Multicast and Broadcast Content Distribution in Mobile Cellular Networks", Global Telecommunications Conference, 2007, Globecom '07, IEEE, Nov. 2007, 5 pages.
Muthusami, Santhanaraj, "Teleca White Papers Solution area: e-MBMS in LTE Increasing broadcast and multicast service capacity and quality using LTE and MBMS", Jun. 2011, 25 pages.
3GPP TS 26-346, "Technical Specification Grouop Services and System Aspects; Multimedia Broadcast/Multicast Service (MBMS); Protocols and codecs", (Release 9); V9.4.0,; Technical Specification, Sep. 2011,150 pages.
Office Action received for U.S. Appl. No. 13/553,880, mailed Mar. 2, 2015, 29 pages.
Extended European Search Report received for European Patent Application No. 13741349.8, mailed Jun. 22, 2015, 8 pages.
"HTTP (File) Streaming and MBMS", 3GPP Draft; S4-AHI196-MBMS-Filestreaming. 3GPP Mobile Communications Competence Centre, Tefefon AB LM Ericsson, Mar. 2-4, 2010, 5 pages, author unknown.
"MPD Profiling to Support DASH over MBMS", 3GPP TSG-SA4 Meeting #67, Qualcomm Inc., Jan. 30, 2012, 6 pages, author unknown.
3rd Generation Partnership Project; Technical Specification Group Services and System Aspects; Multimedia Broadcast/Mulitcast Service (MBMS); Protocols and codecs (Release 10), 3GPP TS 26.346, V10.2.0, Dec. 14, 2011, 152 pages, author unknown.

* cited by examiner

FIG. 2

Transmission 200

*Description Segment*
*211*

*Description Portions*
*212-b*

| | Content Version | Resolution | Bit Rate |
|---|---|---|---|
| 212-1 → | A | 1920 x 1080 | 4 MB/s |
| 212-2 → | B | 1600 x 900 | 2 MB/s |
| 212-3 → | C | 1280 x 720 | 1 MB/s |

*Correspondence Segment*
*213*

*Correspondence Portions*
*214-c*

| | Content Version | Multicast Service |
|---|---|---|
| 214-1 → | A | Service 1 |
| 214-2 → | B | Service 2 |
| 214-3 → | C | Service 3 |

RECEIVE TRANSMISSION COMPRISING DESCRIPTION SEGMENT AND CORRESPONDENCE SEGMENT
502

DETERMINE A PLURALITY OF MULTICAST CONTENT STREAMS BASED ON THE CORRESPONDENCE SEGMENT
504

SELECT AND RECEIVE ONE OR MORE OF THE PLURALITY OF MULTICAST CONTENT STREAMS FOR PROCESSING, BASED ON INFORMATION IN DESCRIPTION SEGMENT
506

ADAPTIVELY SWITCH ACROSS THE PLURALITY OF MULTICAST CONTENT STREAMS FOR RECEPTION AND PROCESSING BASED ON DESCRIPTION SEGMENT
508

FIG. 6

_Storage Medium 600_

*Computer Executable Instructions for 500*

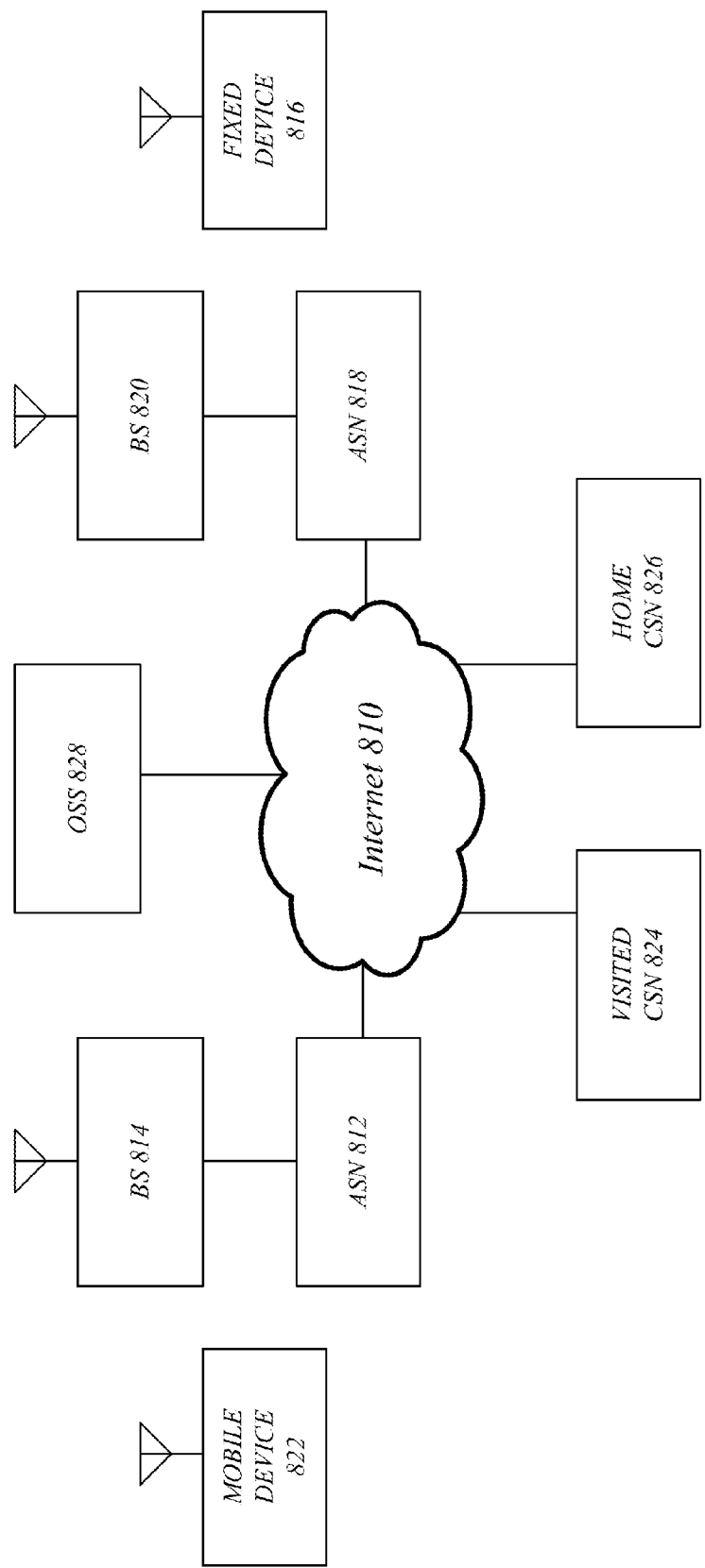

TECHNIQUES FOR IMPROVED MULTICAST CONTENT DELIVERY

RELATED CASES

This application is a continuation of, claims the benefit of and priority to, previously filed U.S. patent application Ser. No. 13/553,880 entitled "TECHNIQUES FOR IMPROVED MULTICAST CONTENT DELIVERY", filed Jul. 20, 2012, which is a non-provisional application claiming priority to U.S. Provisional Patent Application No. 61/591,641, filed on Jan. 27, 2012, both of the above are incorporated herein by reference in their entirety.

BACKGROUND

Computing systems are commonly employed by users to obtain and consume various types of media content, such as videos, audio files, and images. Numerous technologies and standards exist that are employed in various contexts in downloading and consuming media content. Some such technologies and standards pertain to unicast transmission of media content, which involves transmission of media content from one source to one destination. Other such technologies and standards pertain to multicast transmission of media content, which involves transmission of media content from one source to multiple destinations. Multicast transmission may offer improvements in transmission efficiency, and/or the advantageous reduction of bandwidth consumption. Due to wide variation in the capabilities of various computing systems used to consume media content, variation in user subscription profiles, and variation in the qualities and capacities of communications channels used to transmit media content from content suppliers to content consumers, suppliers of media content may make multiple versions of media content available for consumption. Different versions of a particular media content item may correspond, for example, to different underlying bit rates, different resolutions, different quality layers, and/or different views. Each media content version may be suited to a number of media content consumers. In order to take advantage of the benefits of multicast transmission while providing multiple versions of media content, techniques for improved multicast content delivery may be desirable.

BRIEF DESCRIPTION OF THE DRAWINGS

FIG. 2 illustrates one embodiment of a first transmission.

FIG. 5 illustrates one embodiment of a second transmission.

FIG. 6 illustrates one embodiment of a storage medium.

FIG. 8 illustrates one embodiment of a communications system.

DETAILED DESCRIPTION

Figure 1:
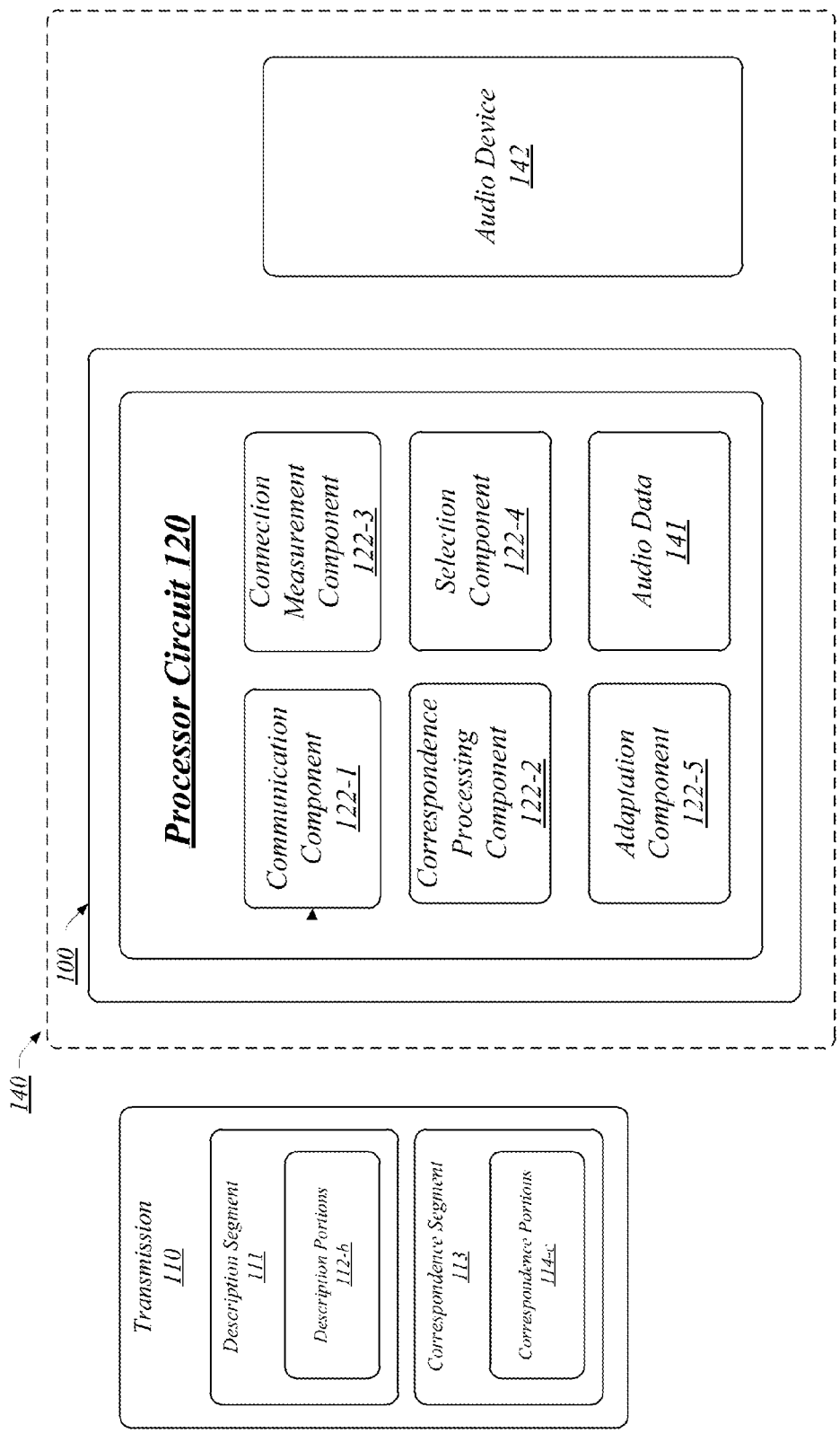
FIG. 1 illustrates one embodiment of an apparatus and one embodiment of a system.

Various embodiments are generally directed to improved multicast content delivery techniques. In some embodiments, for example, an apparatus may comprise a processor circuit, a communication component operative by the processor circuit to receive a data transmission comprising a description segment and a correspondence segment, a correspondence processing component operative by the processor circuit to determine a plurality of multicast content streams representing different versions of a media content based on the correspondence segment, and a selection component operative by the processor circuit to select and receive one or more of the plurality of multicast content streams based on characteristics identified in the description segment. In various such embodiments, the apparatus may comprise an adaptation component operative by the processor circuit to adaptively switch across the plurality of multicast content streams for reception and processing based on characteristics identified in the description segment. Other embodiments are described and claimed.

The techniques disclosed herein may involve transmission of content over one or more wireless connections using one or more wireless mobile broadband technologies. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE ADV) standards, and International Mobile Telecommunications Advanced (IMT-ADV) standards, including their revisions, progeny and variants. Other suitable examples may include without limitation Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8 and 9 of LTE/System Architecture Evolution (SAE), and so forth. The embodiments are not limited in this context.

By way of example and not limitation, various embodiments may be described with specific reference to various 3GPP LTE and LTE ADV standards, such as the 3GPP LTE Evolved UMTS Terrestrial Radio Access Network (E-UTRAN), Universal Terrestrial Radio Access (E-UTRA) and LTE ADV Radio Technology 36 Series of Technical Specifications (collectively "3GPP LTE Specifications"), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 Jan. 2012 titled "Draft Amendment to IEEE Standard for Wireless-MAN-Advanced Air Interface for Broadband Wireless Access Systems, Enhancements to Support Machine-to-Machine Applications" (collectively "IEEE 802.16 Standards"), and any drafts, revisions or variants of the 3GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The embodiments are not limited in this context.

In addition to or alternatively to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments may be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for an apparatus 100. Although the apparatus 100 shown in FIG. 1 has a limited number of elements in a certain topology, it may be appreciated that the apparatus 100 may include more or less elements in alternate topologies as desired for a given implementation.

The apparatus 100 may comprise a computer-implemented apparatus 100 having a processor circuit 120 arranged to execute one or more software components 122-$a$. It is worthy to note that "a" and "b" and "c" and similar designators as used herein are intended to be variables representing any positive integer. Thus, for example, if an implementation sets a value for a=5, then a complete set of software components 122-$a$ may include components 122-1, 122-2, 122-3, 122-4 and 122-5. The embodiments are not limited in this context.

In various embodiments, the apparatus 100 may be implemented in a fixed device. A fixed device generally refers to an electronic device designed to be in a fixed, stationary, permanent or otherwise non-moving position or location that does not vary over time. For instance, a fixed device may be installed with fixtures, attachments and housings to prohibit movement, including wired power lines, transmission lines, and so forth. It may be appreciated that although a fixed device is generally stationary, some fixed devices may be disconnected from their current equipment in a first fixed location, moved to a second fixed location, and connected to equipment at the second fixed location. In some other embodiments, the apparatus 100 may be implemented as a mobile device. A mobile device is designed to be portable enough to be frequently moved between various locations over time. In various embodiments, the apparatus 100 may be implemented in any fixed or mobile electronic device having wireless and/or wired communications capabilities or equipment and compliant with one or more wired and/or wireless communications standards. For example, in one embodiment, the apparatus may comprise a mobile communications device compliant with one or more 3GPP LTE Specifications or IEEE 802.16 Standards. The embodiments are not limited in this context.

The apparatus 100 may comprise the processor circuit 120. The processor circuit 120 may be generally arranged to execute one or more software components 122-$a$. The processing circuit 120 may be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, and XScale® processors; and similar processors. Dual microprocessors, multi-core processors, and other multi-processor architectures may also be employed as the processing unit 120.

The apparatus 100 may comprise a communication component 122-1. In some embodiments, the communication component 122-1 may be arranged for execution by the processor circuit 120 to receive a transmission 110 over a wired or wireless connection. In various embodiments, transmission 110 may comprise a multicast transmission. A multicast transmission may comprise any transmission delivered to a group of destinations substantially simultaneously by a single transmission from a source. In some embodiments, transmission 110 may comply with a Multimedia Broadcast/Multicast Service (MBMS) protocol, such as 3GPP TS 26.346 version 10.3.0 Release 10, released March 2012. In various such embodiments, transmission 110 may comprise an MBMS user services description (USD) transmission that provides application-layer information on the available MBMS services, including related transport options, session description, content characteristics, broadcast schedules and file repair procedures. In various embodiments, transmission 110 may comprise a metadata transmission. The embodiments are not limited in this context.

In some embodiments, a plurality of content versions of a particular content item may be available to apparatus 100 over one or more wireless and/or wired connections. As used herein, the term "plurality" is used to denote two or more of something. Examples of such a particular content item may include videos, audio files, images, and other types of media. Each of the plurality of content versions may comprise a particular version of the particular content item that varies from other versions of the content item based on one or more characteristics. Examples of characteristics based on which the content versions may differ may include underlying bitrate, frame rate, resolution, codec type, audio language, subtitle language, and other characteristics. In various embodiments, each of the plurality of content versions may be available to apparatus 100 via a corresponding multicast service. In some such embodiments, each multicast service may comprise a corresponding content stream. In various embodiments, a plurality of content streams may comprise distinct transmissions and/or transmission streams. In other embodiments, the plurality of content streams may comprise distinct segments within one or more shared transmissions and/or transmission streams. In some embodiments, the plurality of content streams may comprise multicast content streams. In various embodiments, each of the plurality of content versions may be available to apparatus 100 via a content stream in a corresponding MBMS service. The embodiments are not limited in this context.

In various embodiments, each of a plurality of content versions may be transmitted in one or more bitstreams using scalable video coding (SVC) techniques, such as according to Annex G of the ITU-T H.264 standard published Apr. 4, 2012. SVC techniques may generally comprise generating one or more bitstream comprising a base layer and one or more enhancement layers. In some embodiments, each content version may correspond to or be associated with a different SVC layer, each MBMS service may correspond to or be associated with a different content version, and thus each multicast content stream and associated MBMS service may correspond to or be associated with a different SVC layer. In various such embodiments, one of a plurality of MBMS services may correspond to or be associated with an SVC base layer, and each remaining MBMS service from among the plurality of MBMS services may correspond to or be associated with one of a plurality of SVC enhancement layers. The embodiments are not limited in this context.

In some embodiments, each of a plurality of content versions may be transmitted in one or more bitstreams using multi-view video coding (MVC) techniques, such as according to Annex H of the ITU-T H.264 standard published Apr. 4, 2012. MVC techniques may generally comprise combining a plurality of temporally synchronized video streams representing different views of a three-dimensional (3D) video content into one or more encoded bitstreams. In various embodiments, the plurality of content versions may comprise representations of a single 3D scene captured from varying viewpoints. One important special case for MVC is stereoscopic 3D video encoding, in which case two views are encoded, one for the left eye and one for the right eye. MVC introduces inter-view prediction between views in order to improve compression efficiency, as well as supporting ordinary temporal and spatial prediction. MVC is able to compress stereoscopic video in a backwards compatible manner and without compromising the view resolutions. In some embodiments, the single encoded bitstream may be generated by encoding the plurality of temporally synchronized bitstreams based on interview predictions. The embodiments are not limited in this context.

In some embodiments, transmission 110 may comprise a description segment or section 111 and a correspondence segment or section 113. Description segment 111 may comprise information, data, or logic describing characteristics of a plurality of content versions. In various embodiments, description segment 111 may comprise a plurality of description portions 112-b. Each description portion 112-b may comprise metadata information describing characteristics of a particular content version that is available to be received by apparatus 100. The embodiments are not limited in this context.

In some embodiments, correspondence segment 113 may comprise information, data, or logic identifying, for each of the content versions described in description segment 111, a corresponding multicast delivery service description via which that content version is available to be received by apparatus 100. In various embodiments, correspondence segment 113 may comprise correspondence portions 114-c. Each correspondence portion 114-c may comprise information identifying a content version described by a description portion 112-b, and information identifying a multicast delivery service via which the content version described by the description portion 112-b is available to be received by apparatus 100. In some embodiments, a plurality of content streams may correspond to or be associated with a plurality of multicast delivery services, and correspondence segment 113 may comprise information, data, or logic identifying, for each of the content versions described in description segment 111, a corresponding content stream and multicast delivery service via which that content version is available. The embodiments are not limited in this context.

As described herein, multicast services and/or content streams may or may not correspond to or be associated with different physical locations, different network addresses, identifications, and/or locations, or different transmissions. For example, in some embodiments, two different multicast services and/or content streams may correspond to or be associated with two different content source devices (e.g., multicast servers) in two different locations. In other embodiments, two different multicast services and/or content streams may correspond to or be associated with two different source devices (e.g., multicast servers) in the same location. In yet other embodiments, two different multicast services and/or content streams may correspond to or be associated with two different transmissions and/or transmission streams from a single device (e.g., multicast server). In still other embodiments, two different multicast services and/or content streams may correspond to or be associated with differing portions of a single transmission and/or transmission stream from a single device (e.g., multicast server). The embodiments are not limited in this context.

In various embodiments, description segment 111 may comprise a media presentation description (MPD) metadata file received in an MBMS USD transmission, and each description portion 112-b may describe characteristics of a content version available to be received by apparatus 100 via an MBMS service. In some such embodiments, correspondence segment 113 may comprise a plurality of correspondence portions 114-c, each of which identifies an MBMS service via which a corresponding content version described by a description portion 112-b may be received by apparatus 100. In various embodiments, multiple content versions may be available to apparatus 100 as multiple MBMS services. In an example of such an embodiment, a first MBMS service may correspond to or be associated with a high resolution content version and a second MBMS service may correspond to or be associated with a low resolution content version, and description segment 111 may comprise description portion 112-1 describing the high resolution content version and description portion 112-2 describing the low resolution content version. In such an example, correspondence segment 113 may comprise correspondence portion 114-1 identifying the high resolution content version and indicating that it is available via the first MBMS service, and may comprise correspondence portion 114-2 identifying the low resolution content version and indicating that it is available via the second MBMS service. In another example of such an embodiment, a first MBMS service may correspond to or be associated with a base layer (left view) content version and a second MBMS service may correspond to or be associated with an enhancement layer (right view) content version encoded based on SVC (MVC), and description segment 111 may comprise description portion 112-1 describing the base layer (left view) content version and description portion 112-2 describing the enhancement layer (right view) content version. In such an example, correspondence segment 113 may comprise correspondence portion 114-1 identifying the base layer (left view) content version and indicating that it is available via the first MBMS service, and may comprise correspondence portion 114-2 identifying the enhancement layer (right view) content version and indicating that it is available via the second MBMS service. The embodiments are not limited in this context.

In some embodiments, multiple content versions may be available to apparatus 100 as different MBMS services within a single MBMS bundle. In an example of such an embodiment, an MBMS bundle may comprise a first MBMS service corresponding to a high resolution content version, and a second MBMS service corresponding to a low resolution content version, and description segment 111 may comprise description portion 112-1 describing the high resolution content version and description portion 112-2 describing the low resolution content version. In such an example, correspondence segment 113 may comprise correspondence portion 114-1 identifying the high resolution content version and indicating that it is available via the first MBMS service in the MBMS bundle, and may comprise correspondence portion 114-2 identifying the low resolution content version and indicating that it is available via the second MBMS service in the MBMS bundle. The embodiments are not limited in this context.

In various other embodiments, multiple content versions may be available to apparatus 100 as different MBMS services within different MBMS bundles. In an example of such an embodiment, an MBMS bundle may comprise a first MBMS service corresponding to a high resolution content version, and a second MBMS service corresponding to a low resolution content version, and description segment 111 may comprise description portion 112-1 describing the high resolution content version and description portion 112-2 describing the low resolution content version. In such an example, correspondence segment 113 may comprise correspondence portion 114-1 identifying the high resolution content version and indicating that it is available via the first MBMS service in the MBMS bundle, and may comprise correspondence portion 114-2 identifying the low resolution content version and indicating that it is available via the second MBMS service in the MBMS bundle. The embodiments are not limited in this context.

The apparatus 100 may comprise a correspondence processing component 122-2. Correspondence processing component 122-2 may be arranged for execution by the processor circuit 120 to process transmission 110. In some embodiments, correspondence processing component 122-2 may be operative to process transmission 110 to identify a plurality of content versions, identify characteristics of each of the plurality of content versions, and identify a plurality of multicast delivery services via which the content versions are available to apparatus 100. In various embodiments, each of the plurality of multicast delivery services may correspond to or be associated with one of a plurality of content streams. In one example embodiment, correspondence processing component 122-2 may identify a high resolution content version and a low resolution content version, and determine that the high resolution content version is available via a first MBMS service, and that the low resolution content version is available via a second MBMS service. The embodiments are not limited to this example.

The apparatus 100 may comprise a connection measurement component 122-3. Connection measurement component 122-3 may be arranged for execution by the processor circuit 120 to measure and/or analyze signal path characteristics between apparatus 100 and each of the plurality of multicast delivery services and/or content streams. In some embodiments, connection measurement component 122-3 may be operative to measure a channel quality and/or effective bit rate associated with transmission via each multicast delivery service and/or content stream. In embodiments in which correspondence processing component 122-2 has identified a plurality of multicast delivery services comprising MBMS services, connection measurement component 122-3 may be operative to measure a channel quality, effective bit rate, and/or other characteristics associated with transmission via each MBMS service. In embodiments in which the plurality of content versions are available via a plurality of MBMS services within an MBMS bundle, connection measurement component 122-3 may be operative to measure a channel quality, effective bit rate, and/or other characteristics of the MBMS bundle as well as of the MBMS services within the bundle. In embodiments in which each of the plurality of content versions are available via a plurality of MBMS services within a plurality of MBMS bundles, connection measurement component 122-3 may be operative to measure a channel quality, effective bit rate, and/or other characteristics of each of the MBMS bundles, as well as of each of the MBMS services within the bundles. The embodiments are not limited in this context.

The apparatus 100 may comprise a selection component 122-4. Selection component 122-4 may be arranged for execution by the processor circuit 120 to select and receive one or more of a plurality of content versions and/or the corresponding multicast services. Selection of one or more of the plurality of content versions and/or corresponding multicast services may comprise selecting and receiving one or more of a plurality of content streams for processing, including rendering and playback, based on characteristics identified in description segment 111. For example description segment 111 may comprise a description portion 112-1 identifying a first multicast service and/or first content stream as corresponding to a first content version, and selection component 122-4 may select and receive the first content stream for processing based on this correspondence with the first content version.

In various embodiments, selection component 122-4 may be operative to select and receive one or more of the plurality of content versions and/or content streams based on channel quality, effective bit rate, and/or other characteristics of associated with transmission via each of the plurality of multicast services and/or content streams, as measured by connection measurement component 122-3. In an example embodiment, connection measurement component 122-3 may be operative to measure a first effective bit rate associated with transmission of a first content version via a first content stream and may be operative to measure a second effective bit rate associated with transmission of a second content version via a second content stream.

Continuing with the above-recited example, selection component 122-4 may be operative to compare the first effective bit rate with the second effective bit rate, and select and receive either the first content version and/or first content stream or the second content version and/or second content stream based on whether the first effective bit rate or the second effective bit rate is highest possible bitrate supported over the multicast connection to the client. The embodiments are not limited to this example. As noted above, the plurality of content streams may comprise multicast content streams. In some such embodiments, selection component 122-4 may be operative to select and receive for processing a multicast content stream available via an MBMS service. The embodiments are not limited in this context.

In various embodiments, once selection component 122-4 has selected and received a multicast service and/or content stream, communication component 122-1 may be operative to obtain the content version and/or content stream from the corresponding multicast service. In some embodiments, communication component 122-1 may receive one or more content transmissions comprising the content version and/or content stream over a particular channel or frequency designated for the content version and/or content stream as part of the multicast service. In various embodiments, multiple content versions and/or streams may be available via a same channel or frequency, and communications component 122-1 may be operative to identify and process portions of the content transmissions over that channel or frequency that correspond to or are associated with the selected content version and/or content stream. In other some embodiments, each content versions and/or streams may be available via a different channel or frequency as part of the multicast service, and communications component 122-1 may be operative to identify the channel(s) or frequency(ies) over with the selected content version and/or content stream is available, and to process portions of the content transmissions over that channel(s) or frequency(ies) that correspond to or are associated with the selected content version(s) and/or content stream(s). The embodiments are not limited in this context.

The apparatus 100 may comprise an adaptation component 122-5. Adaptation component 122-5 may be arranged for execution by the processor circuit 120 to adaptively switch across a plurality of multicast content streams for reception and processing based on characteristics identified in the description segment. In some embodiments, adaptation component 122-5 may adaptively switch across the plurality of multicast content streams based also on channel quality and/or effective bit rate measurements performed by connection measurement component 122-3. In an example embodiment, after selection component 122-4 has selected and received a multicast service and/or content stream, adaptation component 122-5 may adaptively switch to a different multicast service and/or content stream based on channel quality measurement performed by selection component 122-4 that indicates that rendering and playback of a different multicast service and/or content stream may provide an improved user experience. The embodiments are not limited in this context.

In various embodiments, an MBMS service may comprise the selected content version(s) and/or content stream(s), and communications component 122-1 may be operative to receive content transmissions for the MBMS service and extract the selected content version(s) and/or content stream(s) from those content transmissions. In some such embodiments, the selected content version(s) and/or content stream(s) may correspond to or be associated with an MBMS service comprised within an MBMS service bundle, and communications component 122-1 may be operative to receive content transmissions for the MBMS service bundle, and extract the selected content version(s) and/or content stream(s) from portions of the MBMS service bundle transmissions that correspond to or are associated with the MBMS service to which the selected content version(s) and/or content stream(s) correspond. The embodiments are not limited in this context.

In various embodiments, communications component 122-1 may be operative to receive content transmissions comprising MBMS services and/or service bundles according to a File Delivery Over Unidirectional Transport (FLUTE) protocol. In some such embodiments, communications component 122-1 may be operative to establish a FLUTE session for an MBMS service corresponding to the selected content version and/or content stream, to receive MBMS content transmissions for the MBMS service via the FLUTE session, and to extract the selected content version and/or content stream from the content transmissions received via the FLUTE session. In various embodiments, communication component 122-1 may be operative to establish multiple FLUTE sessions corresponding to multiple MBMS services, to identify the FLUTE session(s) corresponding to the MBMS service(s) comprising the selected content version(s) and/or content stream(s), and to extract the selected content version(s) and/or content stream(s) from content transmissions received via the identified FLUTE session(s). In some such embodiments, the multiple MBMS services may be comprised within a single MBMS service bundle. The embodiments are not limited in this context.

In an example embodiment, two versions of a video may be available via an MBMS service bundle: a high resolution version and a low resolution version. The MBMS service bundle may comprise a first MBMS service corresponding to the high resolution version, and a second MBMS service corresponding to the low resolution version. Communication component 122-1 may receive a transmission 110. Transmission 110 may comprise a description segment 111 that describes the high resolution version and the low resolution version. Transmission 110 may also comprise a correspondence segment 113. Correspondence processing component 122-2 may process correspondence segment 113 to identify the MBMS service bundle and the first and second MBMS services, and to determine that the high resolution version corresponds to the first MBMS service, and the low resolution version corresponds to the second MBMS service. Connection measurement component 122-3 may then measure the channel quality associated with transmission of the MBMS service bundle. Based on the measured channel quality, selection component 122-4 may select and receive the high resolution version for processing. Based on the determination by correspondence processing component 122-2 that the high resolution version corresponds to the first MBMS service, communication component 122-1 may receive the MBMS service bundle transmissions and extract from the MBMS service bundle transmissions the content stream corresponding to the first MBMS service. The embodiments are not limited to this example.

In another example embodiment, two versions of a video may be available via an MBMS service bundle: a base layer (left view) version and enhancement layer (right view) version encoded via SVC (MVC). The MBMS service bundle may comprise a first MBMS service corresponding to the base layer (left view) version, and a second MBMS service corresponding to the enhancement layer (right view) version. Communication component 122-1 may receive a transmission 110. Transmission 110 may comprise a description segment 111 that describes the base layer (left view) and the enhancement layer (right view) version. Transmission 110 may also comprise a correspondence segment 113. Correspondence processing component 122-2 may process correspondence segment 113 to identify the MBMS service bundle and the first and second MBMS services, and to determine that the base layer (left view) version corresponds to the first MBMS service, and the enhancement layer (right view) version corresponds to the second MBMS service. Connection measurement component 122-3 may then measure the channel quality associated with transmission of the MBMS service bundle. Based on the determination that measured channel quality is sufficiently high to receive both the base and enhancement layers (left and right views), selection component 122-4 may select and receive both base layer (left view) and enhancement layer (right view) versions for processing. Based on the determination by correspondence processing component 122-2 that the base layer (left view) version corresponds to the first MBMS service and that the enhancement layer (right view) version corresponds to the second MBMS service, communication component 122-1 may receive the MBMS service bundle transmissions and extract from the MBMS service bundle transmissions the content stream corresponding to both the first and second MBMS services. The embodiments are not limited to this example.

FIG. 1 may also illustrate one embodiment of a system 140. System 140 may comprise apparatus 100 and audio device 142. Audio device 142 may comprise any device capable of generating tones, music, speech, speech utterances, sound effects, background noise, or other sounds based on received audio data. Examples of audio device 142 may include a speaker, a multi-speaker system, a home entertainment system, a television, a consumer appliance, a computer system, a mobile device, and a portable electronic media device, among other examples. The embodiments are not limited in this context.

In various embodiments, audio device 142 may be arranged to generate tones, music, speech, speech utterances, sound effects, background noise, or other sounds based on audio data 141 received from apparatus 100. In some embodiments, audio data 141 may be generated by processor circuit 120, in conjunction with playback of one or more content steams received by communication component 122-1. The embodiments are not limited in this context.

FIG. 2 may illustrate one embodiment of a transmission 200, which may be the same as or similar to transmission 110 in FIG. 1. As shown in FIG. 2, transmission 200 comprises a description segment 211 and a correspondence segment 213. In the example of FIG. 2, description segment 211 comprises description portions 212-1, 212-2, and 212-3. Description portion 212-1 indicates two characteristics of content version A. Namely, description portion 212-1 indicates that content version A has a resolution of 1920 by 1080, and a bitrate of 4 MB/s. Similarly, description portion 212-2 indicates that content version B has a resolution of 1600 by 900, and a bitrate of 2 MB/s, and description portion 212-3 indicates that content version C has a resolution of 1280 by 720, and a bitrate of 1 MB/s. Also, in the example of FIG. 2, correspondence segment 213 comprises correspondence portions 214-1, 214-2, and 214-3. Correspondence portion 214-1 indicates a multicast service corresponding to content version A. Namely, correspondence portion 214-1 indicates that content version A is available via multicast service 1. Similarly, correspondence portion 214-2 indicates that content version B is available via multicast service 2, and correspondence portion 214-3 indicates that content version C is available via multicast service 3. It is worthy of note that although description portions 212-*b* and correspondence portions 214-*c* are shown in tabular format in FIG. 2 for ease of illustration, in some embodiments, transmission 200 may comprise the information of description portions 212-*b* and correspondence portions 214-*c* in any format, and need not necessarily comprise tables. The embodiments are not limited in this context.

Figure 3A:
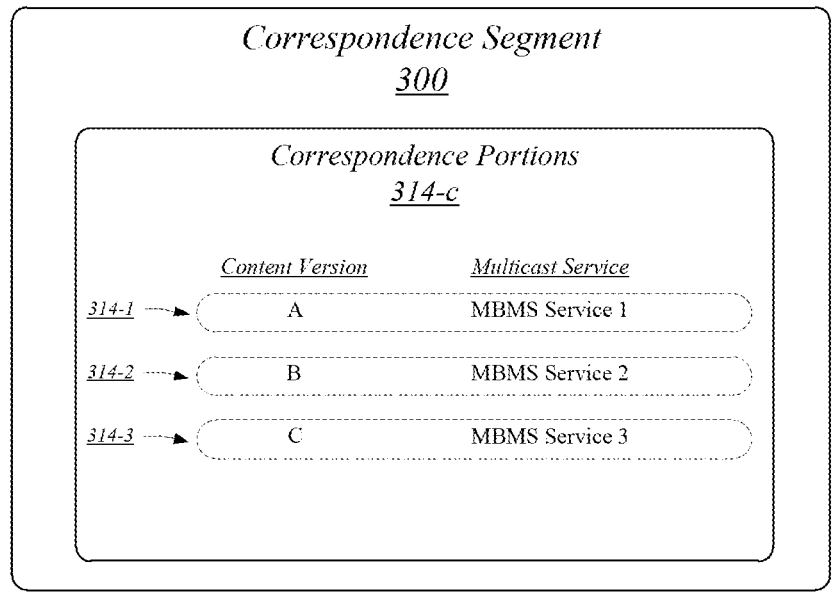
FIG. 3A illustrates a first embodiment of a correspondence segment.

FIG. 3A may illustrate a first embodiment of a correspondence segment 300, such as may be comprised within transmission 200 of FIG. 2. FIG. 3A comprises an example of a correspondence segment that may be associated with embodiments in which a plurality of content versions are available as a plurality of MBMS services. As shown in FIG. 3A, correspondence segment 300 comprises correspondence portions 314-1, 314-2, and 314-3. In the example of FIG. 3A, correspondence portion 314-1 indicates that content version A is available via MBMS Service 1, correspondence portion 314-2 indicates that content version B is available via MBMS Service 2, and correspondence portion 314-3 indicates that content version C is available via MBMS Service 3. The embodiments are not limited to this example.

Figure 3B:
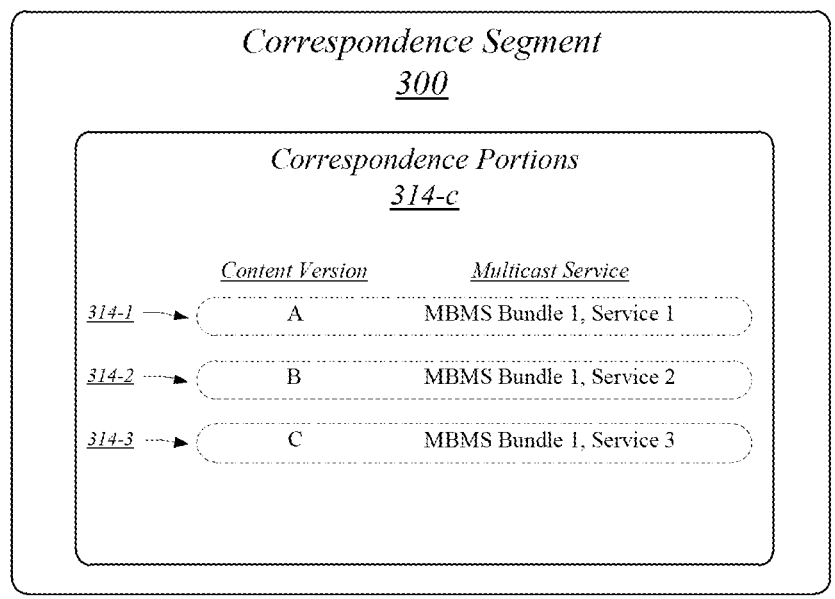
FIG. 3B illustrates a second embodiment of a correspondence segment.

FIG. 3B may illustrate a second embodiment of a correspondence segment 300, such as may be comprised within transmission 200 of FIG. 2. FIG. 3B comprises an example of a correspondence segment that may be associated with embodiments in which a plurality of content versions are available as a plurality of MBMS services within a single MBMS service bundle. As shown in FIG. 3B, correspondence segment 300 comprises correspondence portions 314-1, 314-2, and 314-3. In the example of FIG. 3B, correspondence portion 314-1 indicates that content version A is available via MBMS Bundle 1, Service 1, correspondence portion 314-2 indicates that content version B is available via MBMS Bundle 1, Service 2, and correspondence portion 314-3 indicates that content version C is available via MBMS Bundle 1, Service 3. The embodiments are not limited to this example.

Figure 3C:
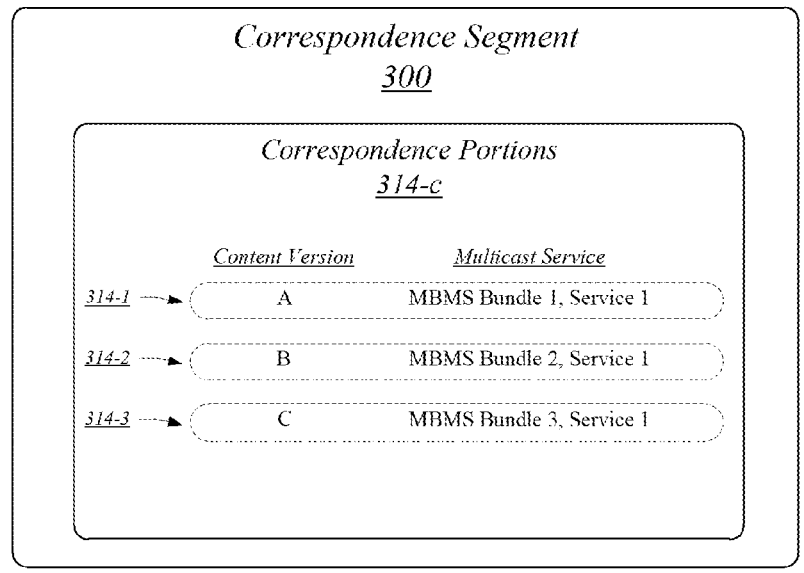
FIG. 3C illustrates a third embodiment of a correspondence segment.

FIG. 3C may illustrate a third embodiment of a correspondence segment 300, such as may be comprised within transmission 200 of FIG. 2. FIG. 3C comprises an example of a correspondence segment that may be associated with embodiments in which a plurality of content versions are available as a plurality of MBMS services within a plurality of MBMS service bundles. As shown in FIG. 3C, correspondence segment 300 comprises correspondence portions 314-1, 314-2, and 314-3. In the example of FIG. 3C, correspondence portion 314-1 indicates that content version A is available via MBMS Bundle 1, Service 1, correspondence portion 314-2 indicates that content version B is available via MBMS Bundle 2, Service 1, and correspondence portion 314-3 indicates that content version C is available via MBMS Bundle 3, Service 1. The embodiments are not limited to this example.

In various embodiments, communication component 122-1 may be operative to establish one or more File Delivery over Unidirectional Transport (FLUTE) sessions with one or more Broadcast Multicast Service Centers (BMSCs). In some embodiments, each FLUTE session may correspond to an MBMS service or an MBMS service bundle, such that receipt of content transmissions associated with a particular MBMS service is conducted via a FLUTE session corresponding to that MBMS service or an MBMS service bundle to which the MBMS service belongs.

Figure 3D:
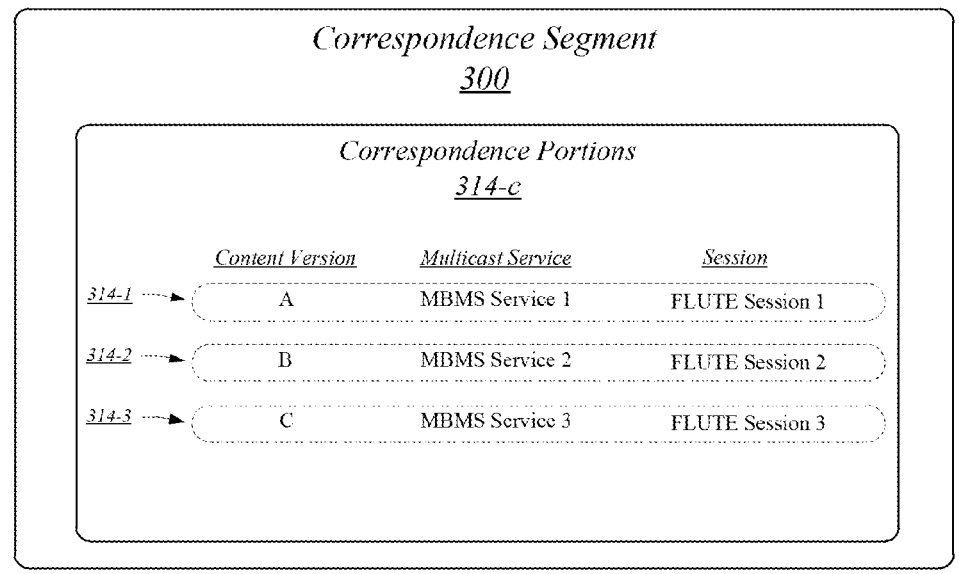
FIG. 3D illustrates a fourth embodiment of a correspondence segment.

FIG. 3D may illustrated a fourth embodiment of a correspondence segment 300, such as may be comprised within transmission 200 of FIG. 2, and such as may be suitable for use in embodiments in which MBMS services and/or MBMS service bundles are received via FLUTE sessions. As shown in FIG. 3D, correspondence segment 300 comprises correspondence portions 314-1, 314-2, and 314-3. In the example of FIG. 3D, correspondence portion 314-1 indicates that content version A is available in MBMS Service 1 via FLUTE Session 1, correspondence portion 314-2 indicates that content version B is available in MBMS Service 2 via FLUTE Session 2, and correspondence portion 314-3 indicates that content version C is available in MBMS Service 3 via FLUTE Session 3. The embodiments are not limited to this example.

Figure 4:
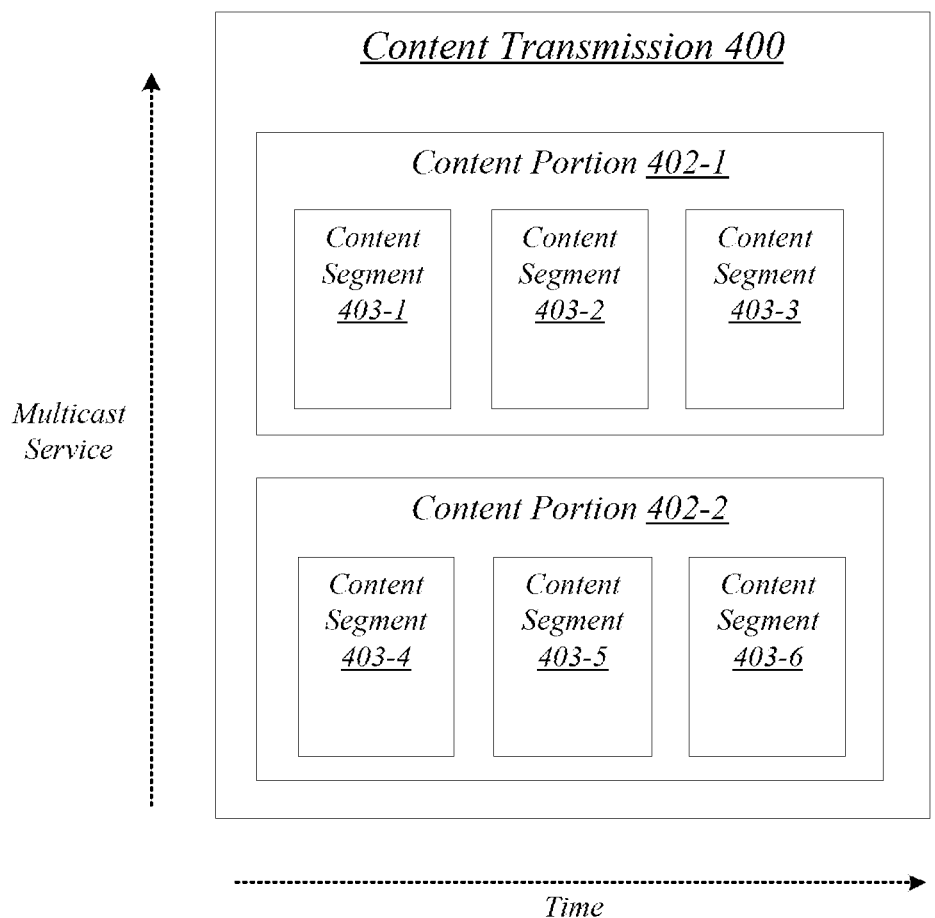
FIG. 4 illustrates one embodiment of a logic flow.

FIG. 4 may illustrate one embodiment of a content transmission 400. In the example of FIG. 4, content transmission 400 may be exemplary of various embodiments in which multiple multicast services correspond to different portions of the same transmission or series of transmissions that may be occurring simultaneously. As shown in FIG. 4, content transmission 400 may comprise content portions 402-1 and 402-2. Content portion 402-1 comprises content segments 403-1, 403-2, and 403-3, and content portion 402-2 comprises content segments 403-4, 403-5, and 403-6. As illustrated by the time axis in FIG. 4, the various content segments within a particular content portion may be transmitted sequentially in time. As illustrated by the multicast service axis in FIG. 4, the various content portions may be transmitted via varying multicast services. In some embodiments, content portion 402-1 may correspond to a first content version, and content portion 402-2 may correspond to a second content version. In various such embodiments, selection component 122-4 may select and receive the first content version and/or the second content version, and the communication component 122-2 may extract the content segments from the content portion(s) corresponding to the selected content version(s). In an example embodiment, selection component 122-4 may select and receive the first content version, and communication component 122-2 may extract content segments 403-1, 403-2, and 403-3 from content portion 402-1, which correspond to the first content version. The embodiments are not limited to this example.

In some embodiments, content transmission 400 may correspond to an MBMS service bundle content transmission. In various such embodiments, each content portion within content transmission 400 may correspond to a different MBMS service within an MBMS service bundle. For example, content portion 402-1 may correspond to a first MBMS service within the MBMS service bundle, and content portion 402-2 may correspond to a second MBMS service within the MBMS service bundle. In some such embodiments, selection component 122-4 may select and receive a content version corresponding to the first MBMS service and/or the second MBMS service, and the communication component 122-2 may extract the content segments from the content portion(s) corresponding to the selected MBMS service(s). In an example embodiment, selection component 122-4 may select and receive a content version corresponding to content portion 402-1 and to a first MBMS service, and communication component 122-2 may extract content segments 403-1, 403-2, and 403-3 from content portion 402-1, which correspond to the first MBMS service and thus to the first content version. The embodiments are not limited in this context.

Included herein is a set of logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on a non-transitory computer readable medium or machine readable medium, such as an optical, magnetic or semiconductor storage. The embodiments are not limited in this context.

FIG. 5 illustrates an embodiment of a logic flow 500. The logic flow 500 may be representative of some or all of the operations executed by one or more embodiments described herein, such as the apparatus 100. More particularly, the logic flow 500 may be implemented by the communication component 122-1, the correspondence processing component 122-2, the connection measurement component 122-3, the selection component 122-4 and/or the adaptation component 122-5.

In the illustrated embodiment shown in FIG. 5, the logic flow 500 may receive a transmission comprising a description segment and a correspondence segment at block 502. For example, the apparatus 100 of FIG. 1 may receive transmission 110 comprising description segment 111 and correspondence segment 113, via communication component 122-1. In some embodiments, the description segment may identify characteristics of a plurality of content versions. For example, description segment 111 of FIG. 1 may comprise description portions 112-$b$, which may identify characteristics of a plurality of content versions. In various embodiments, the correspondence segment may identify a plurality of multicast content streams corresponding to the plurality of content versions. For example, correspondence segment 113 of FIG. 1 may comprise correspondence portions 114-$c$, which may identify a plurality of multicast content streams corresponding to the plurality of content versions described by description portions 112-$b$. The logic flow 500 may determine a plurality of multicast content streams based on the correspondence segment at block 504. For example, correspondence processing component 122-2 of FIG. 1 may process correspondence portions 114-$c$ to identify the plurality of multicast content streams. The logic flow 500 may select and receive one or more of the plurality of multicast content streams for processing based on information in the description segment at block 506. For example, selection component 122-4 of FIG. 1 may select one or more of the plurality of multicast content streams determined by correspondence processing component 122-2, based on the characteristics identified in description portions 112-$b$. The logic flow 500 may adaptively switch across a plurality of multicast content streams for reception and processing based on characteristics identified in the description segment at block 508. For example, adaptation component 122-5 of FIG. 1 may adaptively switch across the plurality of multicast content streams determined by correspondence processing component 122-2, based on the characteristics identified in description portions 112-$b$. The embodiments are not limited to these examples.

FIG. 6 illustrates an embodiment of a storage medium 600. The storage medium 600 may comprise an article of manufacture. In one embodiment, the storage medium 600 may comprise any non-transitory computer readable medium or machine readable medium, such as an optical, magnetic or semiconductor storage. The storage medium may store various types of computer executable instructions, such as instructions to implement logic flow 500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 7:
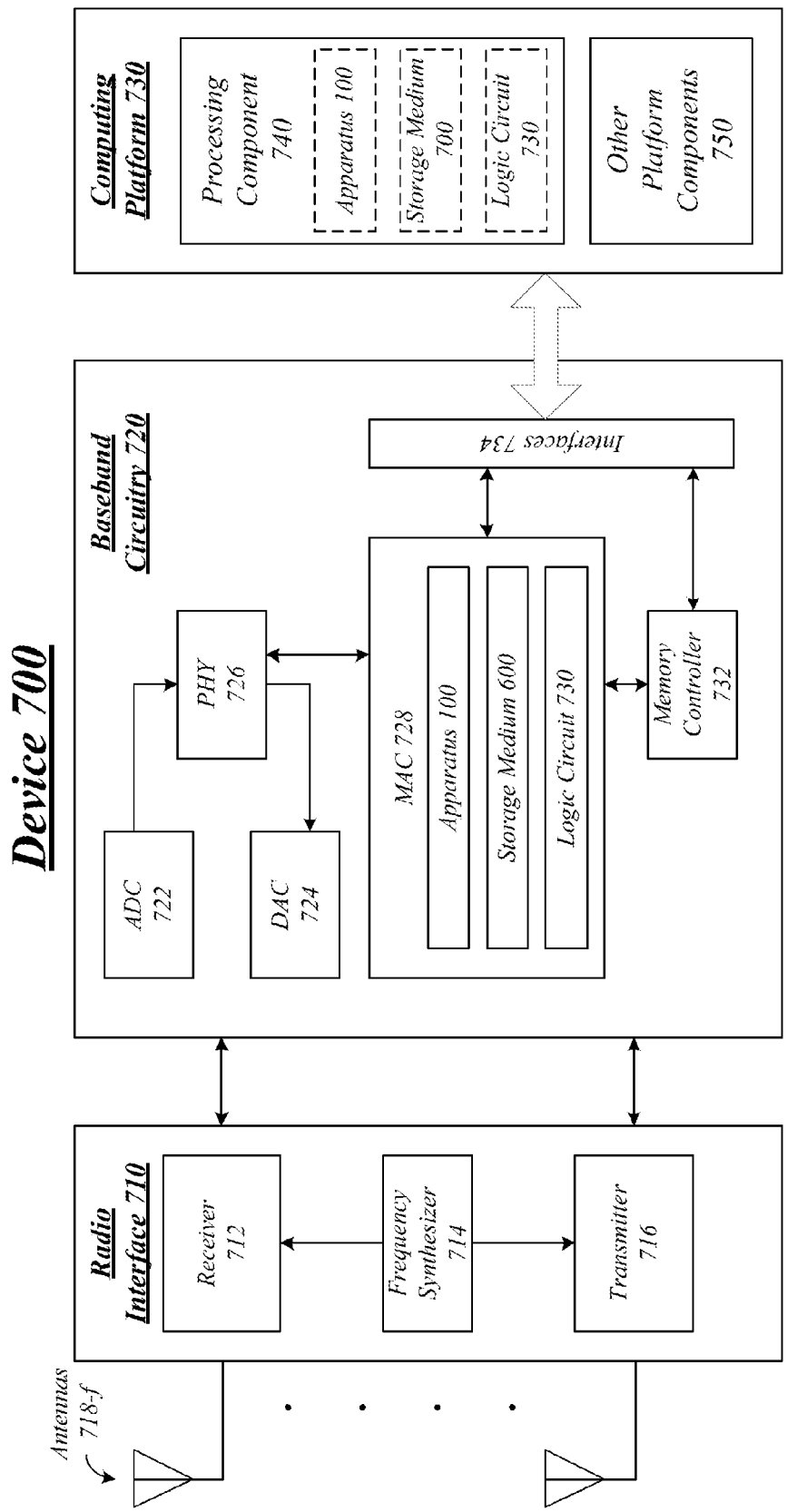
FIG. 7 illustrates one embodiment of a computing architecture.

FIG. 7 illustrates an embodiment of a device 700 for use in a broadband wireless access network. Device 700 may implement, for example, apparatus 100, storage medium 600 and/or a logic circuit 730. The logic circuit 730 may include physical circuits to perform operations described for apparatus 100. As shown in FIG. 7, device 700 may include a radio interface 710, baseband circuitry 720, and computing platform 730, although embodiments are not limited to this configuration.

The device 700 may implement some or all of the structure and/or operations for the apparatus 100, storage medium 600 and/or logic circuit 730 in a single computing entity, such as entirely within a single device. Alternatively, the device 700 may distribute portions of the structure and/or operations for the apparatus 100, storage medium 600 and/or logic circuit 730 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 710 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 710 may include, for example, a receiver 712, a transmitter 716 and/or a frequency synthesizer 714. Radio interface 710 may include bias controls, a crystal oscillator and/or one or more antennas 718-*f*. In another embodiment, radio interface 710 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 720 may communicate with radio interface 710 to process receive and/or transmit signals and may include, for example, an analog-to-digital converter 722 for down converting received signals, a digital-to-analog converter 724 for up converting signals for transmission. Further, baseband circuitry 720 may include a baseband or physical layer (PHY) processing circuit 756 for PHY link layer processing of respective receive/transmit signals. Baseband circuitry 720 may include, for example, a processing circuit 728 for medium access control (MAC)/data link layer processing. Baseband circuitry 720 may include a memory controller 732 for communicating with processing circuit 728 and/or a computing platform 730, for example, via one or more interfaces 734.

In some embodiments, PHY processing circuit 726 may include a frame construction and/or detection module, in combination with additional circuitry such as a buffer memory, to construct and/or deconstruct communication frames, such as packet 600. Alternatively or in addition, MAC processing circuit 728 may share processing for certain of these functions or perform these processes independent of PHY processing circuit 726. In some embodiments, MAC and PHY processing may be integrated into a single circuit.

The computing platform 730 may provide computing functionality for the device 700. As shown, the computing platform 730 may include a processing component 740. In addition to, or alternatively of, the baseband circuitry 720, the device 700 may execute processing operations or logic for the apparatus 100, storage medium 600, and logic circuit 730 using the processing component 730. The processing component 730 (and/or PHY 726 and/or MAC 728) may comprise various hardware elements, software elements, or a combination of both. Examples of hardware elements may include devices, logic devices, components, processors, microprocessors, circuits, processor circuits (e.g., processor circuit 120), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 730 may further include other platform components 750. Other platform components 750 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 700 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, subscriber station, mobile subscriber center, radio network controller, router, hub, gateway, bridge, switch, machine, or combination thereof. Accordingly, functions and/or specific configurations of device 700 described herein, may be included or omitted in various embodiments of device 700, as suitably desired. In some embodiments, device 700 may be configured to be compatible with protocols and frequencies associated one or more of the 3GPP LTE Specifications and/or IEEE 802.16 Standards for WMANs, and/or other broadband wireless networks, cited herein, although the embodiments are not limited in this respect.

Embodiments of device 700 may be implemented using single input single output (SISO) architectures. However, certain implementations may include multiple antennas (e.g., antennas 718-f) for transmission and/or reception using adaptive antenna techniques for beamforming or spatial division multiple access (SDMA) and/or using MIMO communication techniques.

The components and features of device 700 may be implemented using any combination of discrete circuitry, application specific integrated circuits (ASICs), logic gates and/or single chip architectures. Further, the features of device 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

FIG. 8 illustrates an embodiment of a broadband wireless access system 800. As shown in FIG. 8, broadband wireless access system 800 may be an internet protocol (IP) type network comprising an internet 810 type network or the like that is capable of supporting mobile wireless access and/or fixed wireless access to internet 810. In one or more embodiments, broadband wireless access system 800 may comprise any type of orthogonal frequency division multiple access (OFDMA) based wireless network, such as a system compliant with one or more of the 3GPP LTE Specifications and/or IEEE 802.16 Standards, and the scope of the claimed subject matter is not limited in these respects.

In the exemplary broadband wireless access system 800, access service networks (ASN) 814, 818 are capable of coupling with base stations (BS) 814, 820 (or (or eNodeB), respectively, to provide wireless communication between one or more fixed devices 816 and internet 110, or one or more mobile devices 822 and Internet 110. One example of a fixed device 816 and a mobile device 822 is device 700, with the fixed device 816 comprising a stationary version of device 700 and the mobile device 822 comprising a mobile version of device 700. ASN 812 may implement profiles that are capable of defining the mapping of network functions to one or more physical entities on broadband wireless access system 800. Base stations 814, 820 (or eNodeB) may comprise radio equipment to provide RF communication with fixed device 816 and mobile device 822, such as described with reference to device 700, and may comprise, for example, the PHY and MAC layer equipment in compliance with a 3GPP LTE Specification or an IEEE 802.16 Standard. Base stations 814, 820 (or eNodeB) may further comprise an IP backplane to couple to Internet 810 via ASN 812, 818, respectively, although the scope of the claimed subject matter is not limited in these respects.

Broadband wireless access system 800 may further comprise a visited connectivity service network (CSN) 824 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 824 or home CSN 826, and the scope of the claimed subject matter is not limited in these respects. Visited CSN 124 may be referred to as a visited CSN in the case where visited CSN 824 is not part of the regular service provider of fixed device 816 or mobile device 822, for example where fixed 816 or mobile device 822 is roaming away from their respective home CSN 826, or where broadband wireless access system 800 is part of the regular service provider of fixed device 816 or mobile device 822 but where broadband wireless access system 800 may be in another location or state that is not the main or home location of fixed device 816 or mobile device 822.

Fixed device 816 may be located anywhere within range of one or both base stations 814, 820, such as in or near a home or business to provide home or business customer broadband access to Internet 810 via base stations 814, 820 and ASN 812, 818, respectively, and home CSN 826. It is worthy to note that although fixed device 816 is generally disposed in a stationary location, it may be moved to different locations as needed. Mobile device 822 may be utilized at one or more locations if mobile device 822 is within range of one or both base stations 814, 820, for example.

In accordance with one or more embodiments, operation support system (OSS) 828 may be part of broadband wireless access system 800 to provide management functions for broadband wireless access system 800 and to provide interfaces between functional entities of broadband wireless access system 800. Broadband wireless access system 800 of FIG. 8 is merely one type of wireless network showing a certain number of the components of broadband wireless access system 800, and the scope of the claimed subject matter is not limited in these respects.

The following examples pertain to further embodiments:

A method may comprise receiving, at a computing device comprising a processor circuit, a data transmission comprising a description segment and a correspondence segment, identifying a plurality of multicast content streams representing different versions of a media content based on the correspondence segment, and selecting, by the processor circuit, one or more of the plurality of multicast content streams for processing based on characteristics identified in the description segment.

Such a method may comprise receiving the one or more of the plurality of multicast content streams from a multicast server Such a method may comprise rendering the media content from the selected one or more multicast content streams on an output device.

Such a method may comprise adaptively switching, by the processor circuit, across the plurality of multicast content streams for reception and processing based on characteristics identified in the description segment.

According to such a method, each of the plurality of multicast content streams may comprise one of a plurality of multimedia broadcast multicast service (MBMS) services.

According to such a method, the plurality of MBMS services may be comprised within an MBMS service bundle.

According to such a method, the computing device may comprise a dynamic adaptive streaming over hypertext transfer protocol (DASH) client.

According to such a method, the data transmission may comprise a user services description (USD) transmission representing the correspondence segment.

According to such a method, the description segment may comprise a media presentation description (MPD) metadata file within the USD transmission.

Such a method may comprise establishing a plurality of file delivery over unidirectional transport (FLUTE) sessions, each of the plurality of FLUTE sessions corresponding to one of the plurality of multicast content streams.

According to such a method, the correspondence segment may comprise information identifying, for each of the plurality of multicast content streams and corresponding MBMS services, a corresponding one of the plurality of FLUTE sessions.

Such a method may comprise determining one or more FLUTE sessions corresponding to the MBMS services comprising the selected multicast content streams.

Such a method may comprise receiving the selected multicast content streams in the MBMS services corresponding to the determined FLUTE sessions.

Such a method may comprise selecting and receiving the one or more of the plurality of multicast content streams based on a format or underlying bitrate of a content version to which the one or more of the plurality of multicast content streams corresponds.

Such a method may comprise selecting and receiving the one or more of the plurality of multicast content streams based on a channel quality or effective bitrate associated with transmission of the one or more of the plurality of multicast content streams.

According to such a method, each of the plurality of multicast content streams and MBMS services may correspond to one of a plurality of layers in a scalable video coding (SVC) bitstream.

According to such a method, each of the plurality of multicast content streams and MBMS services may correspond to one of a plurality of views in a multi-view video coding (MVC) bitstream.

An apparatus may comprise a processor circuit, a communication component arranged for execution by the processor circuit to receive a multicast transmission comprising a description section and a correspondence section, a correspondence processing component arranged for execution by the processor circuit to identify a multicast content stream bundle comprising a plurality of multicast content streams based on the correspondence section, each of the plurality of multicast content streams corresponding to one of a plurality of content versions, and a selection component arranged for execution by the processor circuit to select at least one of the plurality of multicast content streams for processing based on characteristics identified in the description section.

With respect to such an apparatus, the selection component may be arranged for execution by the processor circuit to receive the at least one of the plurality of multicast content streams from a multicast content source device.

With respect to such an apparatus, the processing may comprise rendering and playback of the media content.

Such an apparatus may comprise an adaptation component arranged for execution by the processor circuit to adaptively switch across the plurality of multicast content streams for reception and processing based on characteristics identified in the description section.

With respect to such an apparatus, each of the plurality of multicast content streams may comprise one of a plurality of multimedia broadcast multicast service (MBMS) services.

With respect to such an apparatus, the multicast content stream bundle may comprise an MBMS service bundle.

Such an apparatus may comprise a dynamic adaptive streaming over hypertext transfer protocol (DASH) client.

With respect to such an apparatus, the multicast transmission may comprise a user services description (USD) transmission representing the correspondence section.

With respect to such an apparatus, the description section may comprise a media presentation description (MPD) metadata file within the USD transmission.

With respect to such an apparatus, the communication component may be arranged for execution by the processor circuit to establish a plurality of file delivery over unidirectional transport (FLUTE) sessions, each of the plurality of FLUTE sessions corresponding to one of the plurality of multicast content streams, the correspondence section comprising information identifying, for each of the plurality of multicast content streams and corresponding MBMS services, a corresponding one of the plurality of FLUTE sessions.

With respect to such an apparatus, the correspondence processing component may be arranged for execution by the processor circuit to determine one or more FLUTE sessions corresponding to the MBMS services comprising the selected multicast content streams.

With respect to such an apparatus, the communication component may be arranged for execution by the processor circuit to receive the selected multicast content streams in the MBMS services corresponding to the determined FLUTE sessions.

With respect to such an apparatus, the selection component may be arranged for execution by the processor circuit to select and receive the at least one of the plurality of multicast content streams based on a format or underlying bitrate of a content version to which the at least one of the plurality of multicast content streams corresponds, or based on a channel quality or effective bitrate associated with transmission of the at least one of the plurality of multicast content streams.

With respect to such an apparatus, each of the plurality of multicast content streams and MBMS services may correspond to one of a plurality of layers in a scalable video coding (SVC) bitstream.

With respect to such an apparatus, each of the plurality of multicast content streams and MBMS services may correspond to one of a plurality of views in a multi-view video coding (MVC) bitstream.

At least one machine-readable medium may comprise a plurality of instructions that, in response to being executed on a computing device, cause the computing device to receive a user services description (USD) transmission comprising a description section and a correspondence section, and select at least one content stream from among a plurality of content streams identified using the correspondence section, each of the plurality of content streams comprising a multicast content stream associated with a different multicast content version available through a corresponding multimedia broadcast multicast service (MBMS) service, the at least one content stream selected according to properties specified in the description section.

Such at least one machine-readable medium may comprise instructions that, in response to being executed on a computing device, cause the computing device to establish one or more file delivery over unidirectional transport (FLUTE) sessions corresponding to the selected at least one content stream.

Such at least one machine-readable medium may comprise instructions that, in response to being executed on a computing device, cause the computing device to receive the selected at least one content stream using the one or more FLUTE sessions.

With respect to such at least one machine-readable medium, each of the plurality of content streams may be associated with one of a plurality of layers in a scalable video coding (SVC) stream.

With respect to such at least one machine-readable medium, each of the plurality of content streams may be associated with one of a plurality of views in a multi-view video coding (SVC) stream.

With respect to such at least one machine-readable medium, the plurality of content streams may comprise a plurality of MBMS services within an MBMS service bundle.

Such at least one machine-readable medium may comprise instructions that, in response to being executed on a computing device, cause the computing device to receive the selected at least one content stream from an MBMS server.

Such at least one machine-readable medium may comprise instructions that, in response to being executed on a computing device, cause the computing device to render a multicast content version corresponding to the selected at least one content stream.

A system may comprise a processor, an audio device communicatively coupled to the processor, a communication component arranged for execution by the processor to receive a data transmission comprising a description section and a correspondence section, a correspondence processing component for execution by the processor to identify a plurality of multimedia broadcast multicast service (MBMS) content streams based on the correspondence section, each of the plurality of MBMS content streams corresponding to one of a plurality of content versions, and a selection component arranged for execution by the processor to select at least one of the plurality of MBMS content streams for processing based on characteristics identified in the description section.

With respect to such a system, the selection component may be arranged for execution by the processor to select and receive the at least one of the plurality of MBMS content streams based on a format or underlying bitrate of a content version to which the at least one of the plurality of MBMS content streams corresponds, or based on a channel quality or effective bitrate associated with transmission of the at least one of the plurality of MBMS content streams.

Such a system may comprise an adaptation component arranged for execution by the processor to adaptively switch across the plurality of MBMS content streams for reception and processing based on characteristics identified in the description section.

With respect to such a system, the communication component may be arranged for execution by the processor to establish a plurality of file delivery over unidirectional transport (FLUTE) sessions, each of the plurality of FLUTE sessions corresponding to one of the plurality of MBMS content streams, the correspondence section comprising information identifying, for each of the plurality of MBMS content streams, a corresponding one of the plurality of FLUTE sessions.

With respect to such a system, the communication component may be arranged for execution by the processor to receive the selected at least one MBMS content stream in one or more MBMS services corresponding to the determined FLUTE sessions.

With respect to such a system, the plurality of MBMS content streams may be comprised within an MBMS service bundle.

With respect to such a system, the description section may comprise a media presentation description (MPD) file within a user services description (USD) transmission.

Such a system may comprise a dynamic adaptive streaming over hypertext transfer protocol (DASH) client.

With respect to such a system, each of the plurality of MBMS content streams may correspond to one of a plurality of layers in a scalable video coding (SVC) bitstream.

With respect to such a system, each of the plurality of MBMS content streams may correspond to one of a plurality of views in a multi-view video coding (MVC) bitstream.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Furthermore, in the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements.

In addition, the term "and/or" may mean "and," it may mean "or," it may mean "exclusive-or," it may mean "one," it may mean "some, but not all," it may mean "neither," and/or it may mean "both," although the scope of claimed subject matter is not limited in this respect. In the following description and/or claims, the terms "comprise" and "include," along with their derivatives, may be used and are intended as synonyms for each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the scope of the appended claims.

The invention claimed is:

1. User Equipment (UE), comprising:
 a radio frequency (RF) receiver arranged to receive a multicast transmission comprising a user service description (USD) of a multimedia broadcast/multicast service (MBMS) protocol, the multicast transmission to comprise a description section and a correspondence section; and
 a processor circuit arranged to identify a multicast content stream bundle comprising multicast content streams based on the correspondence section, each of the plurality of multicast content streams corresponding to one of a plurality of content versions, and select one of the multicast content streams to process based on characteristics identified in the description section and on a channel quality measurement for a channel over which the selected multicast content stream is to be received.

2. The UE of claim 1, the processor circuit to render and playback media content from one of the multicast content streams.

3. The UE of claim 1, the processor circuit to adaptively switch across a set of multicast content streams to receive and process one of the multicast content streams based on characteristics identified in the description section.

4. The UE of claim 1, each of the multicast content streams to comprise a multimedia broadcast multicast service (MBMS).

5. The UE of claim 4, the multicast content stream bundle comprising an MBMS service bundle.

6. The UE of claim 1, comprising a dynamic adaptive streaming over hypertext transfer protocol (DASH) client.

7. The UE of claim 1, the multicast transmission comprising a user services description (USD) transmission to represent the correspondence section.

8. The UE of claim 7, the description section comprising a media presentation description (MPD) metadata file within the USD transmission.

9. The UE of claim 1, the RF receiver arranged to receive one of the multicast content streams from a multicast content source device.

10. User Equipment (UE), comprising:
 a radio arranged to receive a multicast transmission comprising a description section and a correspondence section; and
 a processor circuit arranged to identify a multicast content stream bundle comprising multicast content streams based on the correspondence section, each of the multicast content streams corresponding to one of a plurality of content versions communicated via a multimedia broadcast multicast service (MBMS), and select one of the multicast content streams to process based on characteristics identified in the description section and on a channel quality measurement for a channel over which the selected multicast content stream is to be received.

11. The UE of claim 10, the radio to establish one or more file delivery over unidirectional transport (FLUTE) sessions, each of the plurality of FLUTE sessions corresponding to one of the multicast content streams, and the correspondence section to comprise information identifying, for each multicast content stream and corresponding MBMS service, a corresponding FLUTE session.

12. The UE of claim 11, the processor circuit to determine a FLUTE session corresponding to a MBMS service comprising the selected multicast content stream.

13. The UE of claim 12, the communication component to receive the selected multicast content stream in the MBMS service corresponding to the determined FLUTE session.

14. The UE of claim 10, the processor circuit to select the multicast content stream based on a format or underlying bitrate of a content version to which the multicast content stream corresponds, or based on an effective bitrate associated with transmission of the multicast content stream.

15. The UE of claim 10, each multicast content stream and MBMS service to correspond to a layer in a scalable video coding (SVC) bitstream.

16. The UE of claim 10, each multicast content stream and MBMS service to correspond to a view in a multi-view video coding (MVC) bitstream.

17. User Equipment (UE), comprising:
 a radio interface to receive a wireless data transmission comprising a description section and a correspondence section; and
 circuitry to identify one or more multimedia broadcast multicast service (MBMS) content streams based on the correspondence section, each of the MBMS content streams corresponding to one of multiple content versions, and select at least one of the MBMS content streams to process based on the description section and on a channel quality measurement for a channel over which the at least one selected MBMS content stream is to be received.

18. The UE of claim 17, the circuitry to select the at least one of the MBMS content streams based on a format or underlying bitrate of a content version to which the at least one of the MBMS content streams corresponds, or based on an effective bitrate associated with transmission of the at least one of the MBMS content streams.

19. The UE of claim 17, the circuitry to adaptively switch across the MBMS content streams to receive and process based on characteristics identified in the description section.

20. The UE of claim 17, the radio interface to establish multiple file delivery over unidirectional transport (FLUTE) sessions, each of the FLUTE sessions corresponding to one of the MBMS content streams, the correspondence section comprising information identifying, for each of the MBMS content streams, a corresponding one of the FLUTE sessions.

21. The UE of claim 17, the radio interface to receive the selected at least one MBMS content stream in one or more MBMS services corresponding to the determined FLUTE sessions.

22. The UE of claim 17, the MBMS content streams comprised within an MBMS service bundle.

23. The UE of claim 17, the description section comprising a media presentation description (MPD) file within a user services description (USD) transmission.

24. The UE of claim 17, comprising a dynamic adaptive streaming over hypertext transfer protocol (DASH) client.

25. The UE of claim 17, each of the MBMS content streams corresponding to a layer in a scalable video coding (SVC) bitstream or a view in a multi-view video coding (MVC) bitstream.

* * * * *